United States Patent
Takeyama et al.

(10) Patent No.: US 8,116,626 B2
(45) Date of Patent: Feb. 14, 2012

(54) OPTICAL TRANSMISSION APPARATUS AND OPTICAL ATTENUATION AMOUNT CONTROL METHOD

(75) Inventors: Tomoaki Takeyama, Kawasaki (JP); Ichiro Nakajima, Kawasaki (JP); Keiko Sasaki, Kawasaki (JP); Shinichirou Muro, Kawasaki (JP); Etsuko Hayashi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 452 days.

(21) Appl. No.: 12/453,060

(22) Filed: Apr. 28, 2009

(65) Prior Publication Data
US 2009/0297143 A1 Dec. 3, 2009

(30) Foreign Application Priority Data
May 29, 2008 (JP) .................. 2008-141401

(51) Int. Cl.
*H04B 10/08* (2006.01)
*H04B 10/04* (2006.01)
(52) U.S. Cl. .......................................... 398/34; 398/19
(58) Field of Classification Search .................. None
See application file for complete search history.

(56) References Cited

U.S. PATENT DOCUMENTS
7,813,642 B2 * 10/2010 Muro et al. .................. 398/95
2003/0099475 A1 5/2003 Nemoto et al.

FOREIGN PATENT DOCUMENTS
JP 2003-163641 6/2003

OTHER PUBLICATIONS
C.R. Davidson et al., "Spectral Dependence of Polarization Hole-Burning", Optical Fiber Communication Conference, 2006 and the 2006 National Fiber Optic Engineers Conference, Mar. 5-10, 2006.

* cited by examiner

*Primary Examiner* — Shi K Li
*Assistant Examiner* — Rasheed Black-Childress
(74) *Attorney, Agent, or Firm* — Staas & Halsey LLP

(57) ABSTRACT

In an optical transmission apparatus, levels of signal lights obtained by demultiplexing a WDM signal and corresponding to channels are detected, based on which a channel in which a signal is transmitted and a channel in which no signal is transmitted are determined. An attenuation amount of a channel in which no signal is transmitted in a predetermined range from the channel in which the signal is transmitted is set to a value equal to an attenuation amount of the channel in which the signal is transmitted. An attenuation amount of a channel in which no signal is transmitted out of the predetermined range from the channel in which the signal is transmitted is set to a value larger than the attenuation amount of the channel in which the signal is transmitted. The signal lights are attenuated based on the values and multiplexed.

8 Claims, 4 Drawing Sheets

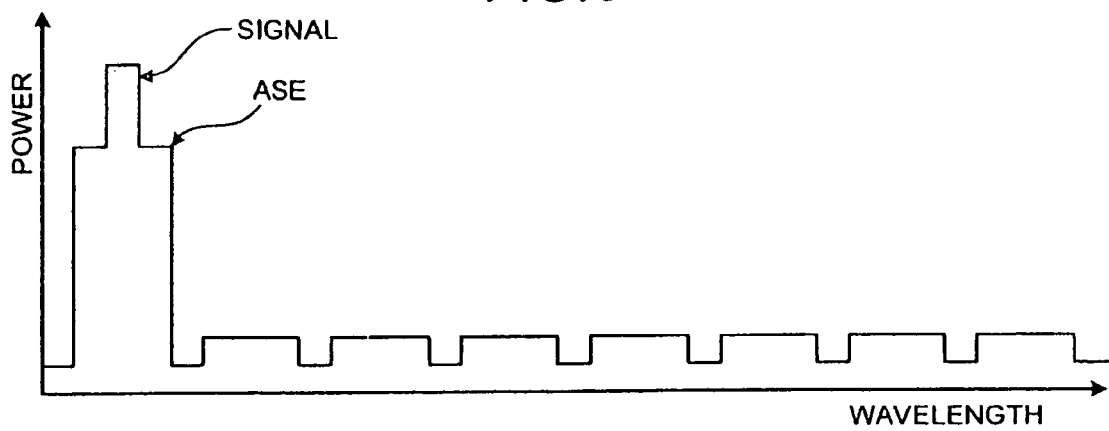
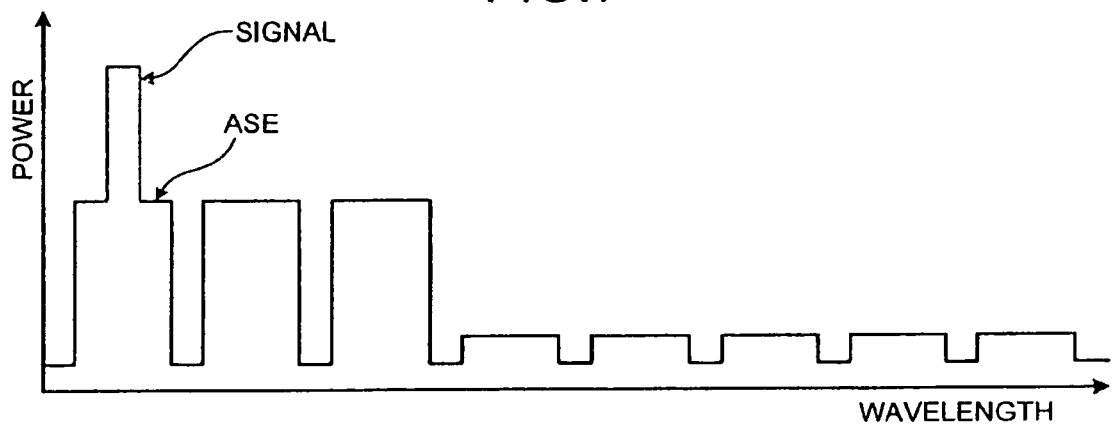
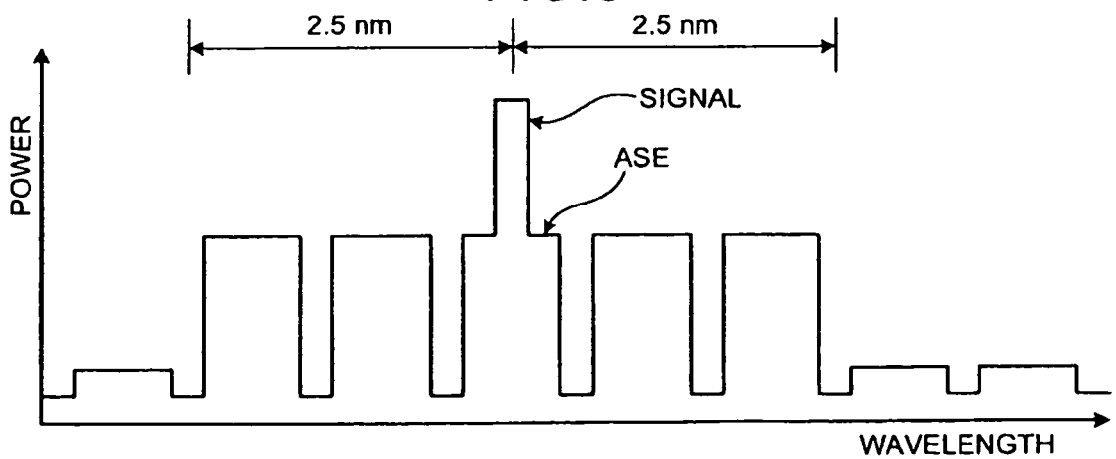

OPTICAL TRANSMISSION APPARATUS AND OPTICAL ATTENUATION AMOUNT CONTROL METHOD

CROSS-REFERENCE TO RELATED APPLICATIONS

This application is based upon and claims the benefit of priority of the prior Japanese Patent Application No. 2008-141401, filed on May 29, 2008, the entire contents of which are incorporated herein by reference.

FIELD

The embodiments discussed herein are directed to an optical transmission apparatus and an optical attenuation amount control method.

BACKGROUND

With progress in development of multimedia networks, a demand for dealing with communication traffic is increasing. Under such circumstance, a wavelength division multiplexing (WDM) transmission system configured to relay an optical signal via multiple points and amplifies the optical signal using optical amplifiers plays a major role for achieving economical communication systems in the multimedia society.

For example, in metro core networks where reduction in cost and size is emphasized, WDM transmission systems have been positively introduced. Along with such tendency, a large number of optical transmission apparatuses called optical add-drop multiplexer (OADM) have been introduced to stations.

The number of wavelengths in an optical amplifier for amplifying WDM signals varies arbitrarily from 1 to 40. If only one wavelength is transmitted, only amplified spontaneous emission (ASE) is transmitted through ports where no signal rises as represented in FIG. 3. In this case, after multiple-span transmission, the ratio of signal to ASE (S/ASE) extremely lowers, which makes it difficult to determine whether there is a signal using a photo diode (PD).

To deal with such inconvenience, there is a known technology in which the ASE powers of channels to which no signal has been transmitted are reduced to achieve the spectrum represented in FIG. 4 (see, for example, Japanese Patent Application Laid-open No. 2003-163641).

If such VOA control as represented by FIG. 4 is performed, however, the polarization degree extremely increases compared with the case represented in FIG. 3 in which unpolarized ASE is transmitted. This sometimes causes a physical phenomenon called polarization hole-burning (PHB) in an erbium doped fiber (EDF) of an optical amplifier.

When a high-intensity signal light is input to the EDF, the optical gain of the polarized light parallel to the signal light lowers. This phenomenon is PHB (see, for example, "Erbium-doped Light" published by Optronics Co., Ltd., pp. 59 to 61). The gain of the signal light and the gain of the polarized. ASE parallel to the signal light are reduced due to PHB, whereas a gain of ASE perpendicular to the signal light is not reduced because it is not influenced by PHB. As a result, the ASE perpendicular to the signal light is increased compared with the case where the PHB does not occur.

SUMMARY

According to an aspect of an embodiment, an optical transmission apparatus includes a first determining unit that determines to set an attenuation amount of a channel within a predetermined wavelength range from a channel in which a signal is transmitted, out of channels in which no signal is transmitted, to a value equal to an attenuation amount of the channel in which the signal is transmitted; a second determining unit that determines to set an attenuation amount of a channel out of the predetermined wavelength range from a channel in which a signal is transmitted, out of the channels in which no signal is transmitted, to a value larger than the attenuation amount of the channel in which the signal is transmitted; and a variable optical attenuator that attenuates the signal lights of the respective channels based on the values determined by the first determining unit and the second determining unit.

The object and advantages of the invention will be realized and attained by means of the elements and combinations particularly pointed out in the claims.

It is to be understood that both the foregoing general description and the following detailed description are exemplary and explanatory only and are not restrictive of the invention, as claimed.

BRIEF DESCRIPTION OF DRAWINGS

FIG. 6 is a schematic diagram of a spectrum obtained by performing control such that an attenuation amount of a wavelength without a signal is set to a maximum value;

FIG. 7 is a schematic diagram of a spectrum obtained by performing control such that only ASE of a channel close to a signal is transmitted; and FIG. 8 is a schematic diagram for explaining generally-performed control using the optical attenuation amount control method according to the embodiment.

DESCRIPTION OF EMBODIMENTS

Preferred embodiments of the present invention will be explained with reference to accompanying drawings.

Figure 1:
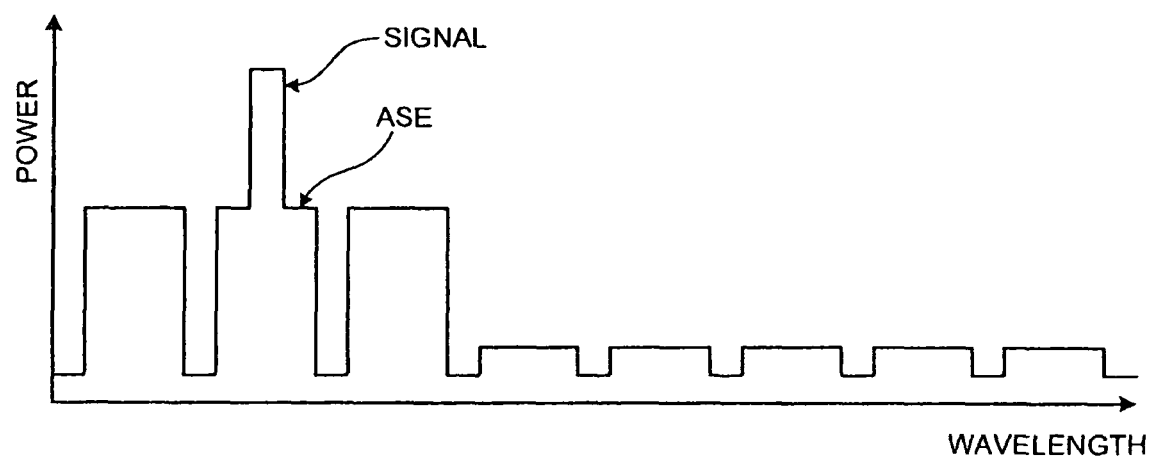
FIG. 1 is a schematic diagram for explaining an example of control using an optical attenuation amount control method according to an embodiment of the present invention.

FIG. 1 is a schematic diagram for explaining an example of control using an optical attenuation amount control method according to an embodiment of the present invention. PHB tends to occur notably if the polarization degree at a wavelength close to a signal is high. Therefore, by lowering only the attenuation amount of a VOA of a channel close to a channel in which a signal rises out of channels in which no signal rises and allowing ASE generated by amplification in an upstream device, the PHB can be prevented and lowering of accuracy in detecting whether there is a signal, which is caused if the S/ASE lowers, can be prevented.

In general, the number of wavelengths in an optical transmission apparatus is 1 to 80, and the output of an optical amplifier is −5 to +5 dBm/ch. To explain an optical attenuation amount control method according to the embodiment, it is provided that an optical transmission apparatus is used. The transmission apparatus has a maximum number of wavelengths of 40, the C band, a minimum wavelength of 1531.9 nm, a maximum wavelength of 1563.0 nm at a frequency of 100 Ghz. The transmission apparatus has a loss of transmission path of 28 dB, and the number of transmission spans of 23 nodes. The transmission apparatus includes an optical amplifier (pre amp) with an input of −25 dBm/ch and an output of 3 dBm/ch, and an optical amplifier (post amp) with an input of −20 dBm/ch and an output of 3 dBm/ch. The transmission apparatus includes a demultiplexer and a multiplexer, and the transmission wavelength band thereof is 0.4 nm.

PHB is characterized in that the optical gain in a range of ±2.5 nm from the signal light is reduced (see, for example, Davidson, C. R.; Pilipetskii, A. N.; Nissov, M.; Foursa, D. G.; Li, H.; Bergano, N. S., "Spectral dependence of polarization hole-burning", Optical Fiber Communication Conference, 2006 and the 2006 National Fiber Optic Engineers Conference 5-10 Mar. 2006 Page(s):3 pp).

Therefore, for example, if a signal light rises in a channel B close to a channel A, the channel A is influenced not only by PHB resulting from a signal light of a wavelength of the channel A but also by PHB of the channel B. This indicates that, the influence of PHB is reduced to a sufficiently small amount by performing equalizing processing with respect to the polarization direction as signals are transmitted via a large number of channels, whereas PHB notably occurs with a single wavelength because no signal light rises at wavelengths close to the single wavelength and the polarity degree of the wavelength band extremely increases.

As the above document (Davidson et al.) indicates, PHB frequently occurs at short wavelengths close to 1530 nm in the C band with the largest absorption of an EDF or the largest coefficient of radiation. For this reason, it is provided that only a channel 1 transmits a signal.

Figure 5:
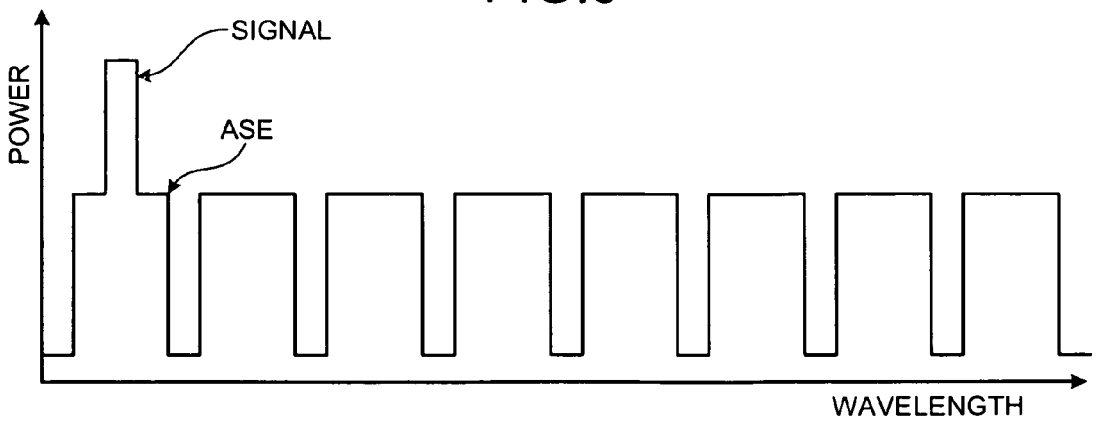
FIG. 5 is a schematic diagram of a spectrum obtained by performing control such that each of attenuation amounts of wavelengths without signals is set to a value equal to an attenuation amount of a wavelength with a signal.

A case represented in FIG. 5 is examined where the optical transmission apparatus performs control such that the attenuation amounts of VOAs of channels in which no signal rises is set to a value equal to an attenuation amount of a VOA in which a signal rises. In this case, for example, if ASE of an output of the pre amp is −3.8 dBm/ch, the power of the ASE of 40 wavelengths is 12.2 dBm. On the other hand, because the signal power is 3 dBm, the signal-power ratio S/(S+ASE) is only 11%. For this reason, even if detection is tried on whether there is a signal light based on the total power using a monitor PD provided to, for example, the input or the output of the amplifier, a signal light is hidden in the ASE, which extremely lowers the determination accuracy.

A case represented in FIG. 6 is examined where the optical transmission apparatus performs control such that the attenuation amounts of the VOAs other than that of the channel 1 are set to the maximum attenuation amount. In this case, because the polarization degree increases due to influence of absence of transmission ASE, PHB occurs, so that the output of the pre amp increases from −3.8 dBm/ch to 0.8 dBm/ch. However, because the total ASE power lowers from 12.2 dBm to 0.8 dBm, the signal-power ratio S/(S+ASE) increases from 11% to 70% sufficiently, which makes it possible to detect whether there is a signal using the monitor PD.

Regarding the OSNR, however, it is 13 dB in the case of FIG. 5, whereas it lowers to 10 dB in the case of FIG. 6, which increases the possibility an error is caused. The OSNR is defined by a discrimination of 0.1 nm.

A case represented in FIG. 7 is examined where control is performed such that the attenuation amounts of the VOAs of channels 2 and 3 are set to a value equal to the attenuation amount of the VOA of the channel 1 in which a signal rises and the VOAs of the rest of channels are set to the maximum attenuation amount. In this case, the OSNR is 13 dB as in the case represented in FIG. 5, and the hole shape of PHB reflects on a regular distribution with a hole width of 2.5 nm as the above document (Davidson et al.) represents. This means that, the existence of the ASE of the channels 2 and 3 helps reducing the influence of the existence of ASE of further channels on the polarization degree of the channel 1. The ASE power of the three wavelengths is 1.0 dBm, and the signal-power ratio S/(S+ASE) is 61% which is a sufficient value to detect whether there is a signal with the monitor PD.

In the above cases, because only the channel 1 transmits a signal, the ASEs of the channels 2 and 3 are transmitted. However, if, for example, only the channel 2 transmits a signal, the ASEs of the channels 1 and 3 on both sides of the channel 2 more close to the signal wavelengths can be transmitted, thereby increasing the OSNR.

As explained above, in the optical attenuation amount control method according to the embodiment, an attenuation amount of a VOA of a channel within a predetermined range from a channel in which a signal rises among channels in which no signal rises is set to a value equal to an attenuation amount of a VOA of the channel in which the signal rises (preferably to a minimum attenuation amount of the VOA), and the attenuation amounts of the channels out of the range from the channel in which the signal rises are set to a value larger than the attenuation amount of the channel in which the signal rises (preferably to a maximum attenuation amount of the VOA). The predetermined range is a wavelength of ±2.5 nm as represented in FIG. 8.

Figure 2:
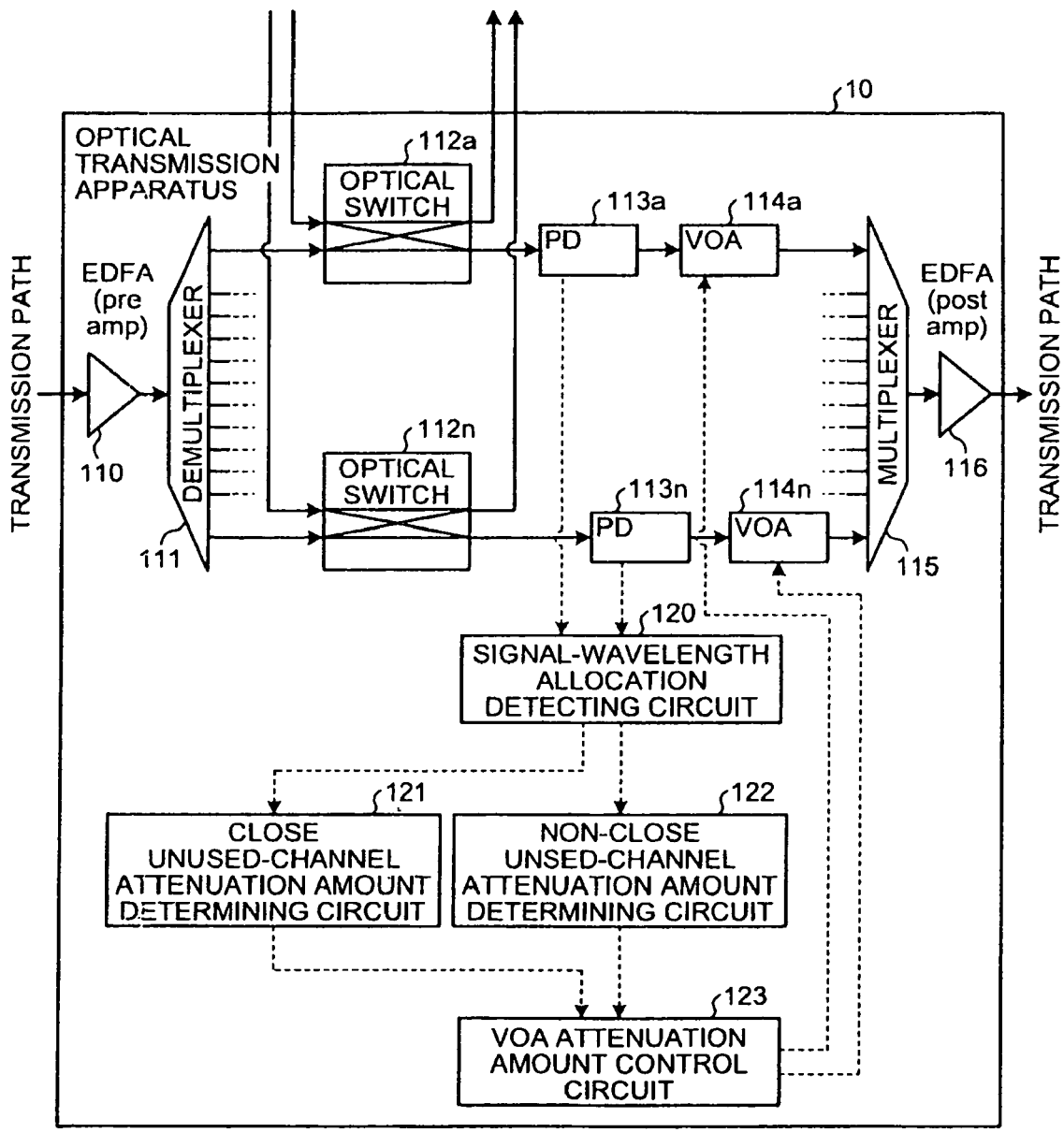
FIG. 2 is a schematic diagram of a configuration of an optical transmission apparatus according to the embodiment.
Figure 3:
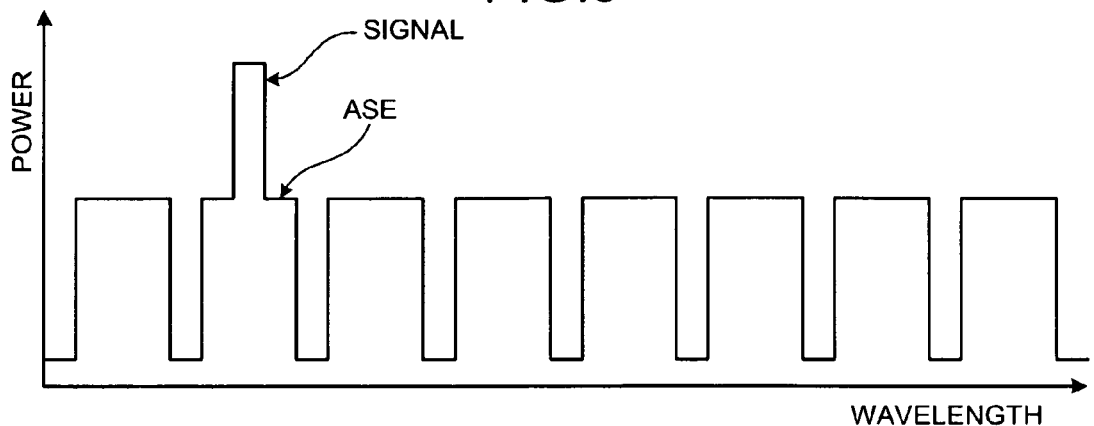
FIG. 3 is a schematic diagram of a spectrum obtained by performing control such that ASE of every wavelength is transmitted.
Figure 4:
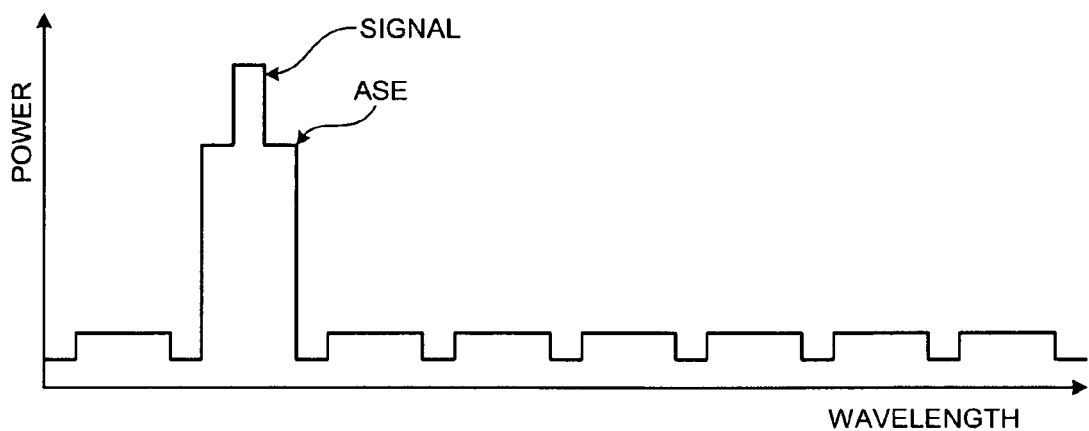
FIG. 4 is a schematic diagram of a spectrum obtained by performing control such that an attenuation amount of a wavelength without a signal is set to a maximum value.

A configuration of an optical transmission apparatus 10 according to the embodiment that performs the optical attenuation amount control method is explained below. FIG. 2 is a schematic diagram of the configuration of the optical transmission apparatus 10. As represented in FIG. 2, the optical transmission apparatus 10 includes an erbium doped fiber amplifier (EDFA) 110, a demultiplexer 111, optical switches 112a to 112n, PDs 113a to 113n, VOAs 114a to 114n, a multiplexer 115, an EDFA 116, a signal wavelength allocation detecting circuit 120, a close unused channel attenuation amount determining circuit 121, a non-close unused channel attenuation amount determining circuit 122, and a VOA attenuation amount control circuit 123.

The EDFA 110 is an optical amplifier that amplifies a WDM signal light input from a transmission path. The demultiplexer 111 is a device that demultiplexes the WDM signal amplified by the EDFA 110 to signal lights respectively corresponding to channels. The demultiplexer 111 is, for example, an arrayed waveguide grating (AWG) or a wavelength selective switch (WSS). Based on predetermined setting, each of the optical switches 112a to 112n perform add processing for transmitting, to a downstream device, an optical signal input from an external network instead of the signal light obtained by demultiplexing the WDM signal by the demultiplexer 111, drop processing for routing the signal light obtained by demultiplexing the WDM signal by the demultiplexer 111 to the external network, or through processing for directly transmitting the signal light obtained by demultiplexing the WDM signal by the demultiplexer 111 to the downstream device.

Each of the PDs 113a to 113n detects a level of a signal light of a corresponding channel. The PDs 113a to 113n can be positioned between the VOAs 114a to 114n and the multiplexer 115. Each of the VOAs 114a to 114n attenuates the level of a signal light of a corresponding channel based on an instruction from the VOA attenuation amount control circuit 123. The multiplexer 115 multiplexes the signal lights of the respective channels. The multiplexer 115 is, for example, an AWG or a WSS. The EDFA 116 is an optical amplifier that amplifies the WDM signal light obtained by multiplexing the signal lights by the multiplexer 115.

The signal wavelength allocation detecting circuit 120 determines a channel in which a signal rises and a channel in which no signal rises based on the result of the detection by the PDs 113a to 113n. The close unused channel attenuation amount determining circuit 121 determines to set an attenuation amount of a channel within a predetermined range from the channel in which a signal rises among channels in which no signal rises to a value equal to the attenuation amount of the channel in which the signal rises. The non-close unused channel attenuation amount determining circuit 122 determines to set an attenuation amount of a channel out of the predetermined range from the channel in which the signal rises among the channels in which no signal rises to a maximum attenuation amount of the VOAs 114a to 114n.

The VOA attenuation amount control circuit 123 controls the attenuation amounts of the VOAs 114a to 114n based on the determination by the close unused channel attenuation amount determining circuit 121 and the non-close unused channel attenuation amount determining circuit 122.

As explained above, in the optical attenuation amount control method according to the embodiment, ASE of a channel close to a channel in which a signal rises is transmitted and ASE of a channel not close to the channel in which the signal rises is largely attenuated, which reduces the influence of PHB, thereby achieving a high OSNR.

A method, an apparatus, a system, a computer program, a recording medium, and a data structure obtained by applying the constituents or expressions of the optical transmission apparatus according to the embodiment, or an arbitral combination of the constituents are effectively used to deal with the inconvenience explained above.

According to an aspect of the embodiment, influence of PHB can be reduced.

All examples and conditional language recited herein are intended for pedagogical purposes to aid the reader in understanding the principles of the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:

1. An optical transmission apparatus comprising:
   a first determining circuit that determines to set an attenuation amount of a channel within a predetermined wavelength range from a channel in which a signal is transmitted, out of channels in which no signal is transmitted, to a value equal to an attenuation amount of the channel in which the signal is transmitted;
   a second determining circuit that determines to set an attenuation amount of a channel out of the predetermined wavelength range from a channel in which a signal is transmitted, out of the channels in which no signal is transmitted, to a value larger than the attenuation amount of the channel in which the signal is transmitted; and
   a variable optical attenuator that attenuates the signal lights of the respective channels based on the values determined by the first determining unit and the second determining circuit.

2. The optical transmission apparatus according to claim 1, wherein the predetermined wavelength range is a wavelength range of ±2.5 nanometers.

3. The optical transmission apparatus according to claim 1, wherein the second determining circuit determines to set the attenuation amount of the channel out of the predetermined wavelength range from the channel in which the signal is transmitted, out of the channels in which no signal is transmitted, to a maximum attenuation amount of the variable optical attenuator.

4. The optical transmission apparatus according to claim 1, wherein the first determining circuit determines to set the attenuation amount of the channel within the predetermined wavelength range from the channel in which the signal is transmitted, out of the channels in which no signal is transmitted, to a minimum attenuation amount of the variable optical attenuator.

5. An optical attenuation amount control method comprising:
   first determining to set an attenuation amount of a channel within a predetermined wavelength range from the channel in which a signal is transmitted, out of channels in which no signal is transmitted, to a value equal to an attenuation amount of the channel in which the signal is transmitted;
   second determining to set an attenuation amount of a channel out of the predetermined wavelength range from the channel in which the signal is transmitted, out of the channels in which no signal is transmitted, to a value larger than the attenuation amount of the channel in which the signal is transmitted; and
   attenuating the signal lights of the respective channels based on the values determined at the first determining and the second determining.

6. The optical attenuation amount control method according to claim 5, wherein the predetermined wavelength range is a wavelength range of ±2.5 nanometers.

7. The optical attenuation amount control method according to claim 5, wherein the second determining includes determining to set the attenuation amount of the channel out of the predetermined wavelength range from the channel in which the signal is transmitted, out of the channels in which no signal is transmitted, to a maximum attenuation amount of the attenuating.

8. The optical transmission apparatus according to claim 5, wherein the first determining includes determining to set the attenuation amount of the channel within the predetermined wavelength range from the channel in which the signal is transmitted, out of the channels in which no signal is transmitted, to a minimum attenuation amount of the attenuating.

* * * * *